UNITED STATES PATENT OFFICE.

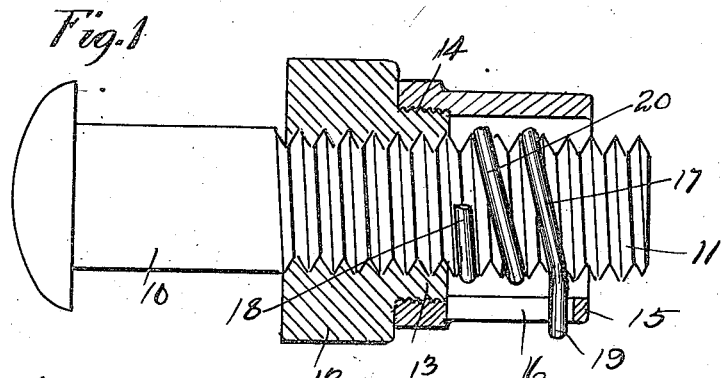
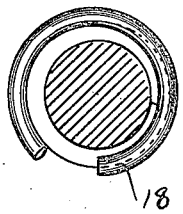
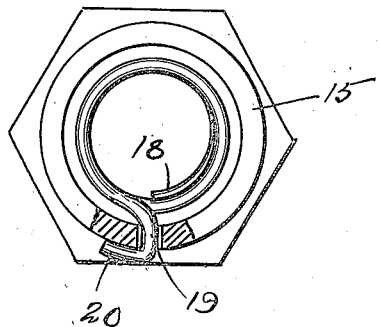
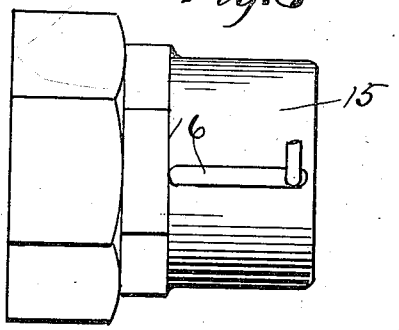
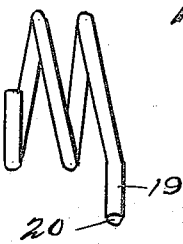
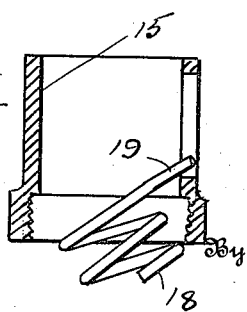

JOHAN E. JOHANNESSEN, OF BROOKLYN, AND OSBORNE A. WAAGE, OF NEW YORK, N. Y., ASSIGNORS OF ONE-THIRD TO DUTEE W. FLINT, OF PROVIDENCE, RHODE ISLAND.

NUT-LOCK.

1,258,777.  Specification of Letters Patent.  Patented Mar. 12, 1918.

Application filed March 6, 1917. Serial No. 152,783.

*To all whom it may concern:*

Be it known that we, JOHAN E. JOHANNESSEN, a citizen of the United States, and OSBORNE A. WAAGE, a subject of the King of Norway, and residents of Brooklyn, county of Kings, State of New York, and New York city, in the county of Kings and State of New York, respectively, have invented certain new and useful Improvements in Nut-Locks, of which the following is a specification.

This invention relates to improvements in means for locking nuts on screw threaded bolts, rods and the like, and the object of the invention is to provide a spring wire wound in a helical form to encircle the threaded portion of the bolt; this coil is carried by the nut and has one end engaged to be moved by the nut, whereby the coil is adapted to be freely screwed onto the bolt with the nut, the coil being caused to contract about and grip the bolt when the direction of rotation of the nut is reversed.

A further object of the invention is to form the pitch of the coil greater than that of the thread of the bolt around which it is wound, whereby the threads of the bolt are crossed by the coil thus causing the coil to more surely grip and bind the bolt when the nut receives a retrograde motion.

A still further object of this invention is to provide a nut having a projection on one end to which is secured a housing member which carries the locking coil.

With these and other objects in view, the invention consists of certain novel features of construction, as will be more fully described, and particularly pointed out in the appended claims.

In the accompanying drawings:

Figure 1— is a sectional side elevation of the nut and its housing including the coil, all being applied to a threaded bolt.

Fig. 2— is an end view of the nut and the coil mounted therein.

Fig. 3— is a sectional end view of the bolt on line 3—3 of Fig. 1 showing the shape of the helical coil as riding over the top of some of the threads of the bolt.

Fig. 4— is a detail of the helical spring.

Fig. 5— is a sectional view of the housing member showing the manner of tipping the spring in order to pass its end through the slot in the wall of the housing.

Fig. 6— is a side elevation of the nut with the housing attached thereto.

Referring to the drawings, 10 designates the bolt, rod or other similar device as provided with a thread 11 onto which the nut 12 is screwed. This nut is preferably provided with an externally threaded boss 13 on its outer face as at 14, and onto this boss is screwed a tubular housing member 15 slotted longitudinally through its side wall as at 16. This housing member is for the purpose of carrying or inclosing the locking wire 17 which is coiled in a helical form therein, said coil being preferably of a pitch greater than that of the pitch on the thread on the bolt, whereby its inner end 18 is caused to fit into the groove between the threads on the bolt, and the other coils are arranged to pass over the top of some portion of the next adjacent threads, the outer end 19 of the coil is carried off radially and passed through the slot 16 with its extremity 20 bent at substantially a right angle to lie against the outer wall of the housing.

In mounting this spring in the housing it is only necessary to tip the coil at an angle as illustrated in Fig. 5 and pass the end 19 through the slot 16 in the wall of the housing, then upon straightening up the coil, the housing may be screwed into position on the boss of the nut and the whole is then ready to be threaded onto the bolt 10.

The action of this lock is as follows:—

The wire coil is of a size to engage and follow the thread on the bolt 10 as the nut is screwed thereonto, the end 18 following the groove of the thread, the pitch of the coil causing the next convolution thereof to leave the groove of the thread and cross thereover into the next adjacent groove, the wire then passes once more around the bolt and its end 19 extends through the slot in the side wall of the housing.

It is evident that as the nut is screwed onto the bolt the wire in following the threads offers a slight resistance and therefore the power being applied to the end 19 has a tendency to open up the coil increasing its diameter so as to cause it to run freely on the thread; but when the direction of relative rotation of the nut and bolt is reversed, the action of the housing on the end 19 of the spring coil, owing to the resistance of the coil about the bolt, has a tendency to contract the coil about the bolt, and the greater the resistance, the greater the contraction, and as some of the coils cross the sharp edges of the threads on the bolts, these edges cut into the coil and serve to offer a further resistance to the unscrewing action of the nut.

We have shown and described one embodiment of our invention, but we do not wish to be restricted to the exact details of construction as the same may be varied without departing from the spirit of the invention, the scope of which is defined by the appended claims.

We claim:

1. The combination with a threaded bolt, of a nut lock comprising a helically coiled locking spring wire, a nut having a housing portion for said spring, the pitch of the helical spring being greater than that of the thread in said nut, one end of said spring being engaged by the housing for expanding the coil as the nut is applied to the bolt, and contracting the same about the bolt threads upon attempting a reverse action of said nut.

2. The combination with a screw threaded bolt, of a nut lock comprising a nut having a removable housing attached thereto, a helically coiled locking spring mounted in said housing and having a pitch greater than that of the thread of its nut, whereby said coil is expanded slightly about the bolt thread as the nut is applied thereto, and contracted about said bolt thread as the action of the nut is reversed.

In testimony whereof we affix our signatures in presence of two witnesses.

JOHAN E. JOHANNESSEN.
OSBORNE A. WAAGE.

Witnesses:
HOWARD E. BARLOW,
CHESTER G. PAIGE.